United States Patent
Khalil et al.

(10) Patent No.: US 12,536,007 B1
(45) Date of Patent: Jan. 27, 2026

(54) SYSTEMS AND METHODS FOR ON-DEMAND DEPLOYMENT OF PRE-CONFIGURED CONTAINERS

(71) Applicant: NVIDIA CORPORATION, Santa Clara, CA (US)

(72) Inventors: Nader Khalil, San Francisco, CA (US); Alecsander Fong, San Francisco, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 224 days.

(21) Appl. No.: 18/417,496

(22) Filed: Jan. 19, 2024

(51) Int. Cl.
*G06F 8/61* (2018.01)

(52) U.S. Cl.
CPC ...................... *G06F 8/61* (2013.01)

(58) Field of Classification Search
CPC ....................................................... G06F 8/61
See application file for complete search history.

(56) References Cited

U.S. PATENT DOCUMENTS

| | | | |
|---|---|---|---|
| 10,782,959 | B1 | 9/2020 | Schambureck et al. |
| 10,922,064 | B2 * | 2/2021 | Wei .................. G06F 9/445 |
| 10,938,641 | B1 | 3/2021 | Fritz et al. |
| 11,108,629 | B1 | 8/2021 | Cahyadi et al. |
| 11,599,376 | B1 * | 3/2023 | Viswanathan ........ G06F 9/3877 |
| 11,811,878 | B1 | 11/2023 | Van Henten et al. |
| 12,032,977 | B2 * | 7/2024 | Rodriguez ............ G06F 9/4401 |
| 12,141,554 | B2 * | 11/2024 | Masad ...................... G06F 8/33 |
| 2013/0347077 | A1 | 12/2013 | Marum et al. |
| 2017/0244593 | A1 | 8/2017 | Rangasamy et al. |
| 2019/0028336 | A1 * | 1/2019 | Coronado ............... H04L 67/34 |
| 2019/0065619 | A1 * | 2/2019 | Kuo ..................... G06F 16/9574 |
| 2019/0260855 | A1 | 8/2019 | Thomas et al. |
| 2019/0318240 | A1 * | 10/2019 | Kulkarni .................. G06N 3/08 |
| 2021/0103499 | A1 | 4/2021 | Alluboyina et al. |
| 2021/0174248 | A1 * | 6/2021 | Wetherbee ............ H04L 41/145 |
| 2022/0138004 | A1 * | 5/2022 | Nandakumar ........... G06N 5/01 |
| | | | 718/102 |
| 2022/0391124 | A1 * | 12/2022 | Darji ..................... G06F 3/0679 |
| 2022/0391176 | A1 * | 12/2022 | Gupte ....................... G06F 8/34 |
| 2022/0417215 | A1 * | 12/2022 | Parthasarathi .......... H04L 63/04 |

(Continued)

FOREIGN PATENT DOCUMENTS

EP 2 775 397 A2 9/2014

*Primary Examiner* — Douglas M Slachta
(74) *Attorney, Agent, or Firm* — Foley & Lardner LLP (57) ABSTRACT

Systems and methods to support on-demand deployment of pre-configured containers are disclosed. Exemplary implementations may store information electronically, including a particular artificial intelligence (AI) model and corresponding installation information; effectuate a presentation to a user, through a user interface, of a selectable user interface element, wherein the selectable user interface element is associated with the particular artificial intelligence model; responsive to the user selecting the selectable user interface element, provision a particular server that includes a particular Graphics Processing Unit (GPU), launch a container instance on the particular server such that the user has access to the particular GPU, install software in the container instance in accordance with the corresponding installation information, and install the particular AI model in the container instance; and/or perform other actions.

20 Claims, 3 Drawing Sheets

(56) References Cited

U.S. PATENT DOCUMENTS

| | | |
|---|---|---|
| 2023/0266989 A1 | 8/2023 | Van Welzen et al. |
| 2023/0359457 A1 | 11/2023 | Van Der Hoorn et al. |
| 2023/0409528 A1* | 12/2023 | Chirayath ............. G06F 16/164 |
| 2024/0184897 A1 | 6/2024 | Yin et al. |
| 2024/0411544 A1 | 12/2024 | Vijaywargiya et al. |

* cited by examiner

SYSTEMS AND METHODS FOR ON-DEMAND DEPLOYMENT OF PRE-CONFIGURED CONTAINERS

FIELD OF THE DISCLOSURE

The present disclosure relates to systems and methods for pausing and restarting container instances across multiple cloud services platforms.

BACKGROUND

Containers, which are bundles of software applications and the dependencies needed for their code to run, are known. A container may include a file system, code, a runtime environment, system tools, libraries, and other elements. Container orchestration platforms (a.k.a. container orchestrators or container cluster managers suitable to operate and scale containerized applications) are known, such as, e.g., KUBERNETES™.

SUMMARY

Artificial intelligence (AI) models, including but not limited to generative AI models, are usable for a wide variety of tasks due to their flexible and powerful neural networks including billions of parameters and/or weights. Well-known examples include Chat Generative Pre-trained Transformer (CHATGPT), DALL-E, Stable Diffusion, Large Language Model Meta AI (LLaMA), and many other AI models, most of which require substantial computing resources to use, and some of which are open source. For example, one version of LLaMA-2 includes about 70 billion parameters.

Containers are highly portable due to the packaging together of their elements, including code, runtime environments, system tools, libraries, and other elements. In some implementations, containers may include infrastructure services such as storage. Containers may need persistent storage, whether on-premises, in the cloud (e.g., AMAZON WEB SERVICES™ (AWS) cloud storage)), and/or other persistent storage. For example, a container may mount a storage volume, and bind the volume mount to a directory. A container cluster (or simply "cluster") may provide one or more of dynamic container placement, cluster scheduling, labels and replication controllers, connections within a cluster (e.g., using naming resolution), and/or other services. An example of a container platform suitable for creating, deploying, and sharing containers is DOCKER™, which supports the DOCKER ENGINE™ as its runtime environment. Container instances may run on cloud services platforms (also referred to as cloud computing platforms), including but not limited to AMAZON WEB SERVICES™ (AWS), MICROSOFT AZURE™, and GOOGLE™ CLOUD PLATFORM (GCP).

One aspect of the present disclosure relates to a system configured to support on-demand deployment of pre-configured containers. The system may store information electronically, including a particular artificial intelligence (AI) model and corresponding installation information. The system may effectuate a presentation to a user, through a user interface, of a selectable user interface element, wherein the selectable user interface element is associated with the particular artificial intelligence model. The system may, responsive to the user selecting the selectable user interface element, provision a particular server that includes a particular Graphics Processing Unit (GPU). As used herein, the term "GPU" refers to a computing architecture such as a High Performance Computing (HPC) architecture, and not merely or specifically to a personal unit for graphics rendering such as a graphics card. Examples of particular GPUs include the NVIDIA™ A100 architecture, the NVIDIA™ H100 architecture, the AMD™ M1250 architecture, the AMD™ MI300X architecture, and/or other architectures, including from INTEL™, APPLE™, as well as other competitors. The system may launch a container instance on the particular server such that the user has access to the particular GPU. The system may install software in the container instance in accordance with the corresponding installation information. The system may install the particular AI model in the container instance, and/or perform other actions.

Another aspect of the present disclosure related to a method of supporting on-demand deployment of pre-configured containers. The method may include storing information electronically, including a particular artificial intelligence (AI) model and corresponding installation information. The method may include effectuating a presentation to a user, through a user interface, of a selectable user interface element, wherein the selectable user interface element is associated with the particular artificial intelligence model. The method may include, responsive to the user selecting the selectable user interface element, provisioning a particular server that includes a particular Graphics Processing Unit (GPU). The method may include launching a container instance on the particular server such that the user has access to the particular GPU. The method may include installing software in the container instance in accordance with the corresponding installation information. The method may include installing the particular AI model in the container instance. The method may include performing other actions.

As used herein, any association (or relation, or reflection, or indication, or correspondency, or correlation) involving servers, processors, client computing platforms, users, containers, instances, snapshots, pods, clusters, applications, libraries, software development tools, instructions, requests, commands, determinations, transfers, presentations, (user) interfaces, notifications, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
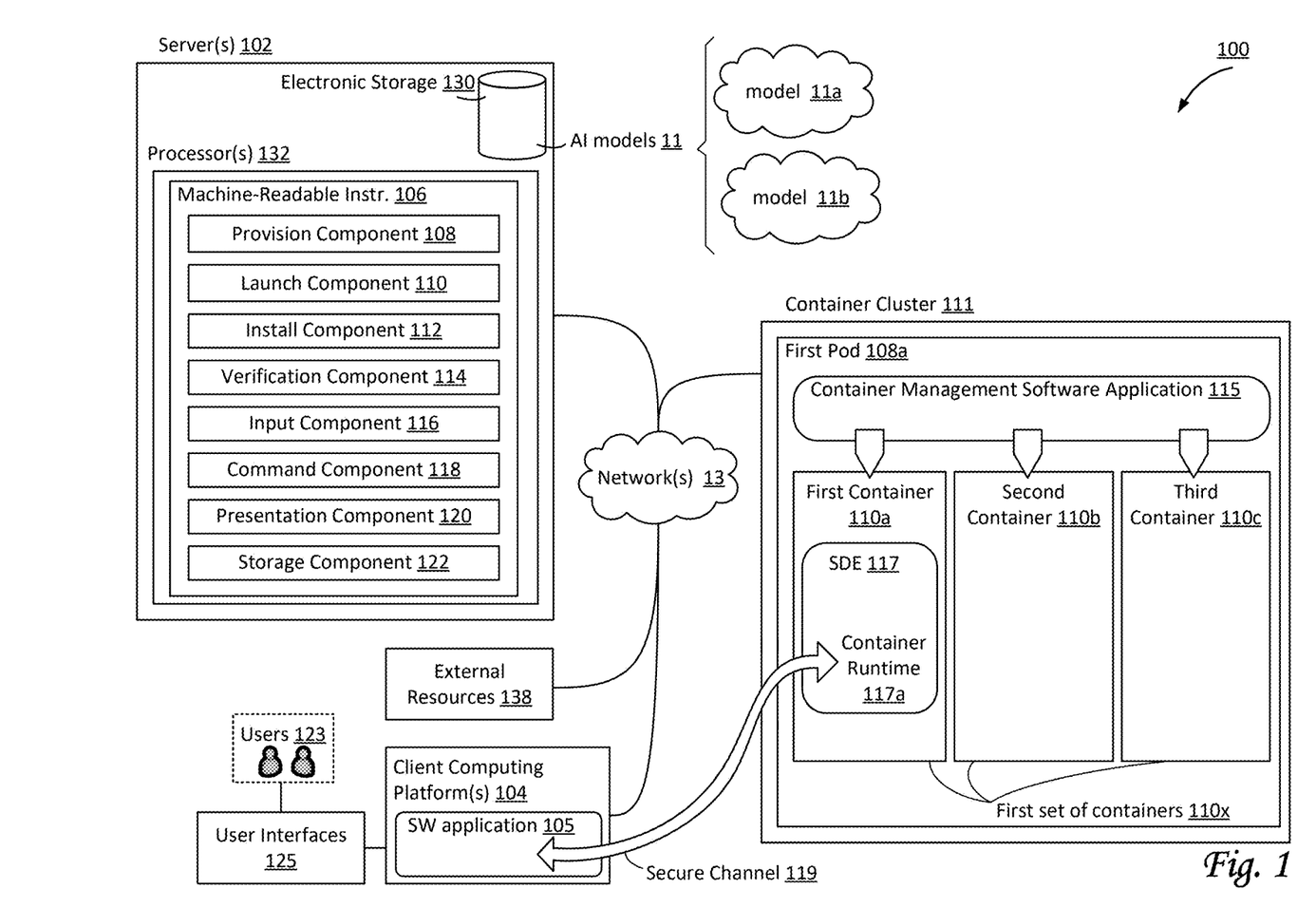
FIG. 1 illustrates a system configured to support on-demand deployment of pre-configured containers, in accordance with one or more implementations.

FIG. 1 illustrates a system 100 configured to support on-demand deployment of pre-configured containers, in accordance with one or more implementations. As described herein, on-demand deployment of a particular pre-configured container can take as little as 1-5 minutes, depending on connection speeds, model size, and/or other parameters. In some implementations, such on-demand deployment may be initiated by one interaction (e.g., one click) in a particular user interface. Once launched, individual ones of the container instances may be configured to enable remote client access to software development environments (SDEs). System 100 may include one or more server(s) 102, client computing platform(s) 104, user interface(s) 125, (access to) cloud services platforms (not depicted), external resource(s) 138, and/or other components. In some implementations, system 100 may include one or more container clusters (not depicted). Users 123 (also referred to as users) may include one or more of a first user, a second user, a third user, and/or other users. As used in descriptions herein, any use of the term "user" may refer to user(s) 123, unless indicated otherwise. Remote client access may originate from client computing platform(s) 104, which may be remote from the one or more servers 102.

Server(s) 102 may be configured to communicate with one or more client computing platforms 104, container clusters 111, and/or with one or more cloud services platforms according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. In some implementations, server(s) 102 may be configured to communicate with client computing platforms 104, users 123, external resource(s) 138, and/or other entities and/or components, e.g., through one or more networks 13 (such as, e.g., the Internet).

Server(s) 102 may include electronic storage 130, (hardware) processor(s) 132, machine-readable instructions 106, and/or other components. Server(s) 102 may be configured by machine-readable instructions 106. Machine-readable instructions 106 may include one or more instruction components. Instruction components (for any set of machine-readable instructions) may include computer program components. The instruction components may include one or more of a provision component 108, a launch component 110, an install component 112, a verification component 114, an input component 116, a command component 118, a presentation component 120, a storage component 122, and/or other instruction components.

Storage component 122 may be configured to manage storage within system 100, including but not limited to electronic storage 130, storage in external resources 138, as well as storage resources in one or more cloud services platforms. Storage component 122 and/or electronic storage 130 may be configured to store information electronically. Stored information may include artificial intelligence (AI) models 11, such as, by way of non-limiting example, a first AI model 11a, a second AI model 11b, and so forth. In some implementations, the stored information may include installation information that corresponds to one or more AI models. For example, AI model 11a may correspond to particular installation information, and/or vice versa. For example, certain installation information may correspond to AI model 11b, and/or vice versa. Installation information may include (references to) one or more of (a) software applications, (b) software libraries, (c) software development tools, and/or other information related to software (to be installed). For example, an example software application may be a particular version of PYTHON and/or another programming language. For example, an example software library may be a particular version of (NVIDIA's) CUDA and/or another Application Programming Interface (API) for general purpose computing, particularly for GPUs. For example, an example software development tool may be a particular version of a Software Development Kit (SDK).

In some implementations, installation information for a particular AI model may be defined and/or configured by a stakeholder (e.g., the owner and/or developer) of the particular AI model. In some implementations, installation information for a particular AI model may be defined and/or configured by a third party. In some cases, a particular version of an AI model, a software application, a software library (etc.) may depend on the intended, planned, and/or allowed usage of a user of a particular AI model. For example, training or fine-tuning a particular AI model may involve different software (e.g., different versions) than inference. Alternatively, and/or simultaneously, other requirements (e.g., related to computing resources, computing performance, memory capacity, bandwidth, connection speed, etc.) may depend on the intended, planned, and/or allowed usage of a user of a particular AI model. For example, training or fine-tuning a particular AI model may require more available memory than inference.

In some implementations, storage component 122 may be configured to store snapshots, clones, copies, images, and/or preserved states in the storage resources of containers and/or pods, in electronic storage 130, in one or more cloud services platforms, and/or in other storage resources.

Presentation component 120 is configured to present interfaces (e.g., user interfaces 125) to users, e.g., through client computing platforms 104 associated with the respective users. For example, a user interface may include a user-selectable user interface element that is associated with a particular AI model. In some cases, interacting and/or engaging with a particular user-selectable user interface element may be as simple as one click by a particular user. In some implementations, presentation component 120 is configured to effectuate presentations of interfaces to users 123. In some implementations, presentations by presentation component 120 may be performed jointly (or at least in some cooperative manner) with one or more components of system 100. In some implementations, presentation component 120 may present offers (e.g., for usage of AI models) to particular users. In some cases, a presentation may indicate a particular AI model is available for use in exchange for a particular amount of consideration. In some implementations, selectable user interface elements may be part of a browser extension and/or plug-in. In some implementations, the user interface may be a browser interface. For example, upon installation, a user may use a particular AI model for inference directly from the browser interface.

Provision component 108 may be configured to provision servers and/or other computing hardware. In particular, provision component 108 may provision a server that includes a particular Graphics Processing Unit (GPU), using a particular High Performance Computing (HPC) architecture, and/or meeting particular requirements, including but not limited to computing resources, computing performance, memory capacity, bandwidth, connection speed, etc. Operations by provision component 108 may be responsive to selections of user-selectable user interface elements. Operations by provision component 108 may be based on a particular AI model associated with a particular user-selectable user interface element. For example, responsive to selection of a user interface element associated with AI model 11*a*, provision component 108 may provision a particular server that includes a particular High Performance Computing (HPC) architecture that meets the memory capacity requirements of AI model 11*a*. In some implementations, provision component 108 may provision and/or otherwise reserve computing hardware from cloud services platforms.

Launch component 110 may be configured to launch or spin up one or more containers, including a particular container instance. For example, launch component 110 may launch a container instance that runs on a server provisioned by provision component 108. In some implementations, container instances may be launched on a particular cloud services platform. Once a container instance has been launched, a user may have access to the particular GPU and/or HPC architecture within the container instance, e.g., through a software development environment. In some implementations, the container instance may be configured to provide a (remotely-accessible server-based) software development environment to a particular user. The particular user may have root access to the software development environment. In some implementations, launch component 110 may use container a management software application 115. Container management software applications may be configured to create, deploy, and/or share containers. In some cases, a particular container management software application may manage individual container instances.

In some implementations, launch component 110 may be configured to launch or spin up pods that include sets of containers. Sets of containers that are placed and/or scheduled together are known as pods. For example, a KUBERNETES™ node is a pod. Some pods launched by launch component 110 may be referred to as outer pods. In some implementations, these pods may be orchestrated and/or otherwise managed by a container cluster manager (or a container cluster manager platform) such as, e.g., KUBERNETES. Launch component 110 may launch a first pod 108*a* using a container cluster (not depicted), e.g., running on a particular cloud services platform. In some implementations, launch component 110 may launch a second pod (not depicted), a third pod (not depicted), and so forth, using the same container cluster. Launched (outer) pods may be configured to execute one or more container management software applications that create, deploy, and/or share containers. In some implementations, container management software applications may provide one or more of dynamic container placement, cluster scheduling, labels and replication controllers, connections within a cluster (e.g., using naming resolution), and/or other services. By way of non-limiting example, a container management software application may be a container platform similar to or based on DOCKER™. For example, first pod 108*a* may be configured to execute container management software application 115.

Launch component 110 may be configured to launch or spin up (sets of) container instances. In some cases, a container instance may be launched in a virtual machine (e.g., a virtual machine that has been spun up using an AMAZON™ Elastic Compute Cloud (EC2) instance in AWS). In some cases, individual ones of these containers may be referred to as inner containers. Launch component 110 may be configured to launch containers using container management software application 115. For example, launch component 110 may launch a first set of containers 110*x* within first pod 108*a*. In some implementations, launch component 110 may launch a second set of containers within a second pod (not depicted), a third set of containers within a third pod (not depicted), and so forth. Within first pod 108*a*, launch component 110 may launch first set of containers 110*x*, which may include one or more of a first container 110*a*, a second container 110*b*, a third container 110*c*, and so forth. Container management software application 115 may manage individual containers, including first container 110*a*.

Launched containers may be configured to provide software development environments (SDEs), in particular remotely-accessible SDEs and/or server-based SDEs. For example, first container 110*a* in first pod 108*a* may be configured to provide an SDE 117. This SDE 117 may be remotely-accessible from one or more client computing platforms 104. This SDE 117 may be server-based because it uses server 102 and/or a cloud services platform (and/or resources included therein). By way of non-limiting example, at least some persistent data for SDE 117 may be stored external to any client computing platforms 104.

In some implementations, individual remotely-accessible server-based SDEs may be associated with individual uniform resource locators (URLs). In some implementations, SDE 117 may include a container runtime 117*a*. For example, a container runtime may be a runtime in accordance with an Open Container Initiative (OCI™) specification. For example, a container runtime may be "runc". SDE 117 may support execution of commands and/or (software) applications. A process within SDE 117 may have a current (process) state. For example, a data set within SDE 117 may have a current (data set) state. An application within SDE 117 may have a current (application) state. An SDE may have a current (SDE) state. First container 110*a* may have a current (container) state. Container instances 110*b* and 110*c* may have a current (container) states. Any of these different types of state may be maintained, e.g., by server 102 or by a cloud services platform. In some implementations, at least some of the current state may be stored in persistent data storage (e.g., provided by server 102). For example, a particular current container state (also referred to as container instance state) of first container 110*a* may include a deployed (software/web) application. This deployed application may be accessible to one or more users through a particular (public) URL.

In some implementations, system 100 may receive instructions through client computing platforms 104 (e.g., from users). The received instructions may include connection instructions, and/or other instructions. A connection instruction may be an instruction to establish a secure (communication) channel. For example, a particular connection instruction may be to establish a secure channel 119 between a particular client computing platform 104 and SDE 117. In some cases, connection instructions may be transferred using a (standard) network communication protocol, which may be a cryptographic network protocol so as to provide secure communications even over an unsecured network. For example, a particular connection instruction may be (or may be implemented by) a secure shell command (SSH command). This SSH command may be used to create a secure channel such as secure channel 119. In some cases, the particular connection instruction may include and/or otherwise use a specific URL that is specific to an SDE such as SDE 117.

Install component 112 may be configured to download and install software, e.g., in a particular container instance. In some implementations, install component 112 may be configured to install software in accordance with particular installation information. For example, a particular AI model may have particular corresponding installation information. By way of non-limiting example, assume a particular container instance has been launched by launch component 110 such that the user has access to a particular GPU that is suitable for AI model 11a, i.e., that meets the hardware requirements (and/or other requirements) for the particular AI model. AI model 11a may correspond to particular installation information, including one or more of (a) particular software applications, (b) particular software libraries, and (c) particular software development tools. Install component 112 may install (a) the particular software applications, (b) the particular software libraries, and/or (c) the particular software development tools in the particular container instance, in accordance with the particular installation information.

In some implementations, install component 112 may be configured to download and install one or more AI models in a particular container instance. In particular, install component 112 may install a particular AI model such that the user has access to the particular AI model. For example, the user may have access to initiate execution of the particular AI model. Upon this installation, a deployment couples particular software (including but not limited to a particular AI model) with hardware that meets the corresponding (hardware and/or other) requirements for using that particular software.

Verify component 114 may be configured to verify whether a particular user has access to a particular GPU (or type of GPU). In some implementations, verification component 114 may verify whether a particular user has access to a particular server or type of server). In some implementations, verification component 114 may verify whether a given server and/or GPU has sufficient capabilities for execution of a particular AI model. In some cases, if suitable hardware is already available to a user, provision component 108 may need to perform fewer actions prior to the user executing and/or otherwise using the particular AI model.

Input component 116 may be configured to receive input from users, e.g., through client computing platforms 104. In some implementations, input component 116 may receive particular user input from a particular user through a software application 105 executing locally on a particular client computing platform 104. By way of non-limiting example, software application 105 may provide a command line interface to the particular user, including but not limited to a UNIX-based shell. In some implementations, software application 105 may provide interfaces to users through JUPYTER™ notebooks. In some implementations, software application 105 may provide text editing to the particular user, including but not limited to VIM™, EMACS™, GEDIT™, NOTEPADQQ™, text editors similar to one of these, notebooks, and/or other text editors. For example, particular user input received by input component 116 may include one or more instructions to execute a particular command (in an SDE, e.g., in SDE 117). Alternatively, and/or simultaneously, particular user input received by input component 116 may include one or more instructions to execute or launch a particular (software) application (in an SDE, e.g., SDE 117). In some implementations, these instructions may be transferred through a communication channel (e.g., secure channel 119) to the SDE. In some implementations, these instructions may be provided to the SDE via a communication channel (e.g., via secure channel 119).

Command component 118 may be configured to execute commands and/or (software) applications in a particular container, a particular set of containers, a particular pod, or a particular container management software application. In some implementations, execution facilitated by command component 118 may be in accordance with one or more instructions received by input component 116 and/or another component of system 100. For example, command component 118 may execute a command responsive to receiving an instruction for a particular container instance running on a particular cloud services platform.

In some cases, the particular execution of a particular (user) command may modify a current application state (e.g., of an application within SDE 117) into a modified application state. In some cases, the particular execution of a particular command may modify a current SDE state (e.g., of SDE 117) into a modified SDE state. In some cases, the particular execution of a particular command may modify a current container instance state (e.g., of container instance 110c) into a modified container instance state. In some cases, the particular execution of a particular software application may modify a current application state (e.g., of an application within SDE 117) into a modified application state. For example, this modified application state may represent an update to a deployed software application. In some cases, this update of the deployed software application may be (immediately, e.g., within 1 second, or 10 seconds, or 1 minute) accessible to one or more users through the particular (public) URL for the deployed software application. In effect, these modifications provide instantaneous deployment for this software application. In some cases, the particular execution of a particular software application may modify a current SDE state (e.g., of SDE 117) into a modified SDE state. In some cases, the particular execution of a particular software application may modify a current container instance state (e.g., of first container 110a) into a modified container instance state.

Figure 3:
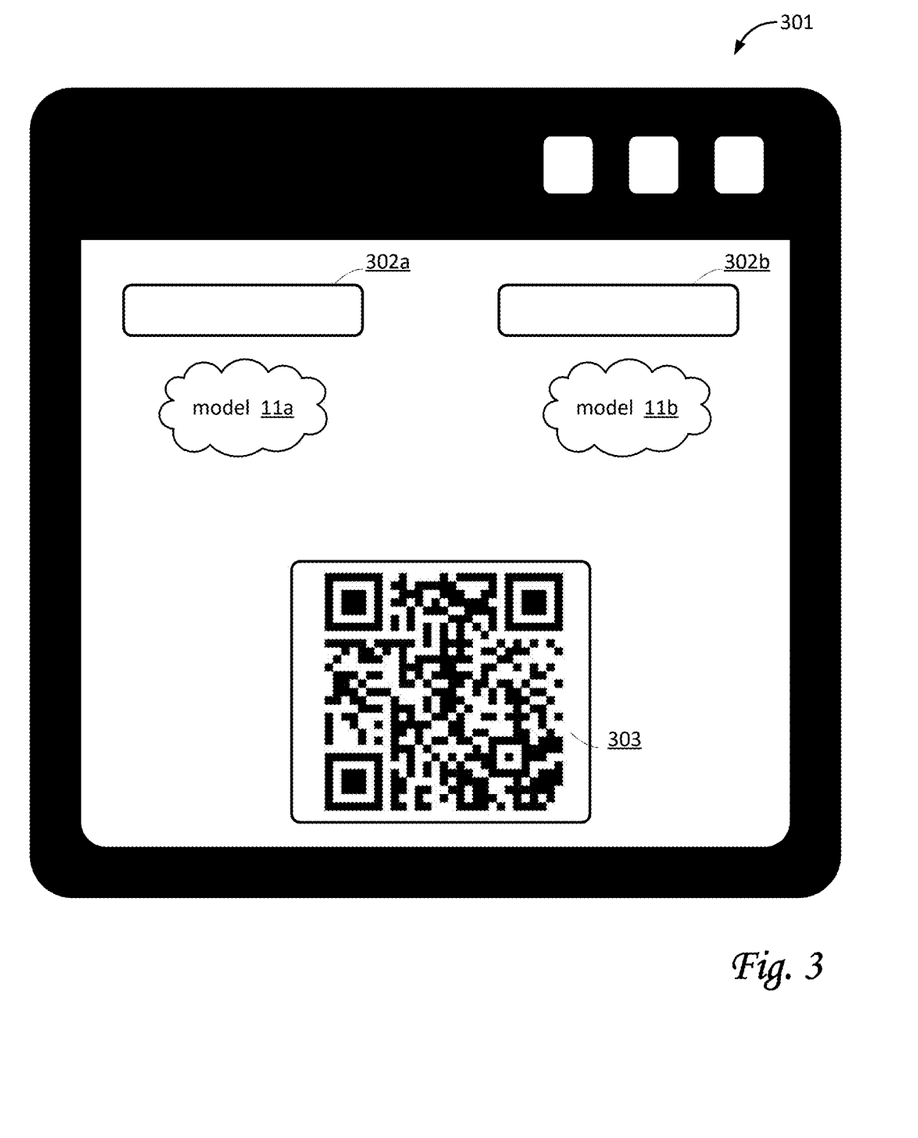
FIG. 3 illustrates an exemplary user interface as may be used by a system that supports on-demand deployment of pre-configured containers, in accordance with one or more implementations.

By way of non-limiting example, FIG. 3 illustrates a user interface 301, as may be used during operation of system 100. User interface 301 may be presented on a local client computing platform 104 as a first presentation of a particular webpage (subsequent to a user requesting the particular webpage through, e.g., a browser application executing on the local client computing platform 104). User interface 301 (or browser interface 301) includes various graphical user interface elements, including an information field 302a, an information field 302*b*, and a QR code 303. Field 302*a* may be configured to present information to the user, such as, by way of non-limiting example, a message to a user and/or other information. By way of non-limiting example, field 302*a* may state: "Click below to deploy AI model 11*a*." and may be followed by information regarding AI model 11*a* and/or its usage (e.g., cost and/or consideration associated with using AI model 11*a*). Field 302*b* may be configured to present information to the user, such as, by way of non-limiting example: "Click below to deploy AI model 11*b*." Responsive to the user following either of these directions, user interface 301 and system 100 (not depicted in FIG. 3) may be configured to proceed as described (e.g., provision a GPU, launch a container instance, install required software, and provide the user with access to a copy of AI model 11*a* or AI model 11*b*, respectively, which may be within browser interface 301 or through a separate user interface). In some implementations, QR code 303 may lead a user to more relevant information, e.g., about AI model 11*a* and/or AI model 11*b*.

Referring to FIG. 1, server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a group or cloud of computing platforms operating together as server(s) 102.

Referring to FIG. 1, in some implementations, server(s) 102, client computing platform(s) 104, and/or external resources 138 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, and/or external resources 138 may be operatively linked via some other communication media.

A given client computing platform 104 may include one or more processors configured to execute computer program components. The computer program components may be configured to enable an expert or user associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms. In some implementations, a particular client computing platform 104 may be configured to execute software application 105.

Referring to FIG. 1, user interfaces 125 may be configured to facilitate interaction between users 123 and system 100 and/or between users 123 and client computing platforms 104. For example, user interfaces 125 may provide an interface through which users 123 may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, one or more user interfaces 125 may be included in one or more client computing platforms 104. In some implementations, one or more user interfaces 125 may be included in system 100.

External resources 138 may include sources of information outside of system 100, external entities participating with system 100 (including third parties such as external web-servers), external providers of computation and/or storage services (e.g., a server external to system 100, or a cloud services platform), external providers of relevant information, and/or other resources. In some implementations, some or all of the functionality attributed herein to external resources 138 may be provided by resources included in system 100. In some implementations, one or more external resources 138 may provide information to other components of system 100.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables system 100 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, and/or 122, and/or other components. Processor(s) 132 may be configured to execute components 108, 110, 112, 114, 116, 118, 120, and/or 122, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, and/or 122 are illustrated in FIG. 1 as being implemented within a single processing unit, in implementations in which processor(s) 132 includes multiple processing units, one or more of components 108, 110, 112, 114, 116, 118, 120, and/or 122 may be implemented remotely from the other components. The description of the functionality provided by the different components 108, 110, 112, 114, 116, 118, 120, and/or 122 described below is for illustrative purposes only, and is not intended to be limiting, as any of components 108, 110, 112, 114, 116, 118, 120, and/or 122 may provide more or less functionality than is described. For example, one or more of components 108, 110, 112, 114, 116, 118, 120, and/or 122 may be eliminated, and some or all of its functionality may be provided by other ones of components 108, 110, 112, 114, 116, 118, 120, and/or 122. As another example, processor(s) 132 may be configured to execute one or more additional components that may perform some or all of the functionality attributed below to one of components 108, 110, 112, 114, 116, 118, 120, and/or 122.

Figure 2:
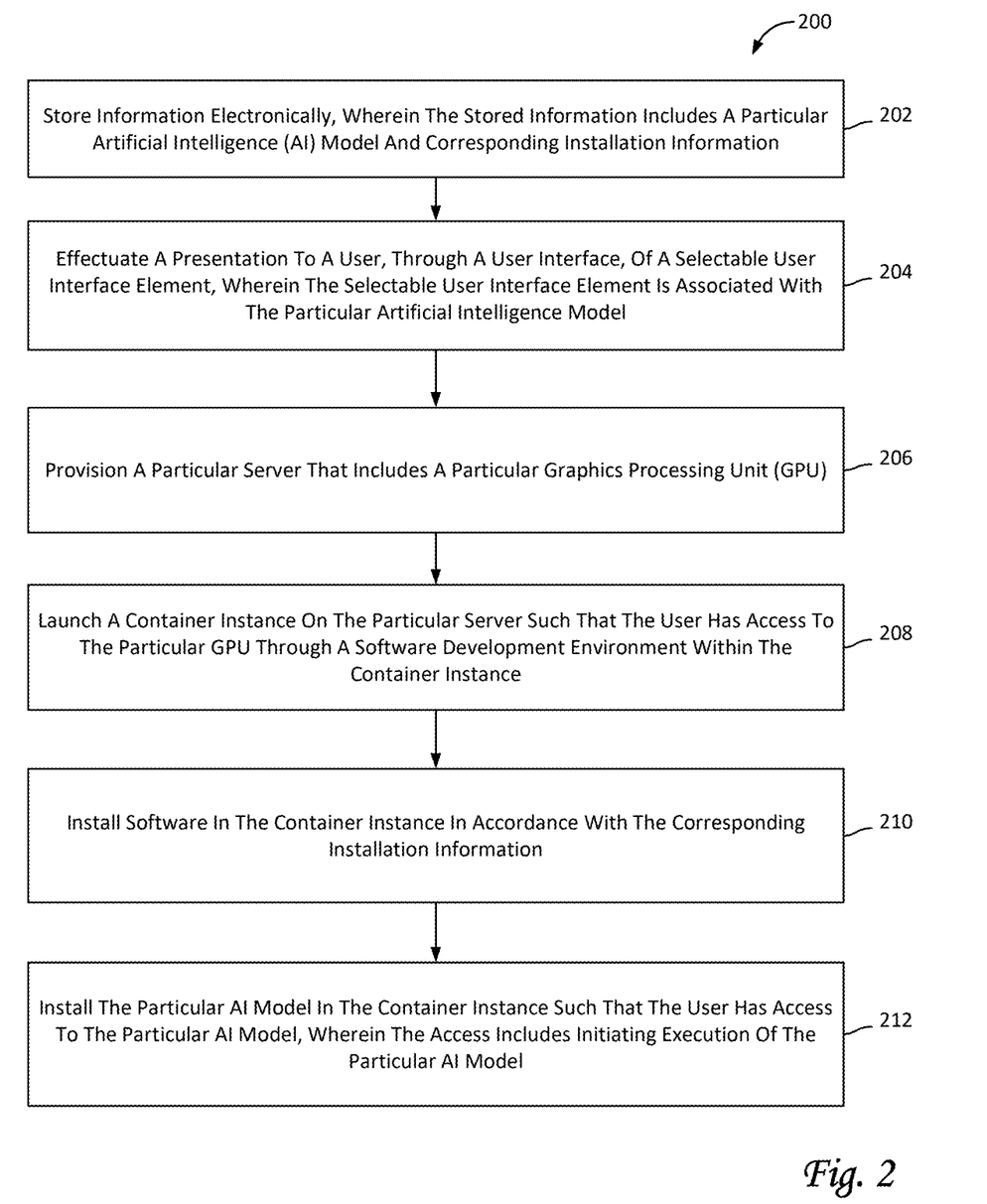
FIG. 2 illustrates a method of supporting on-demand deployment of pre-configured containers, in accordance with one or more implementations.

FIG. 2 illustrates a method 200 of supporting on-demand deployment of pre-configured containers, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, information is stored electronically. The stored information includes a particular artificial intelligence (AI) model and corresponding installation information. The corresponding installation information includes references to one or more of (a) software applications, (b) software libraries, and/or (c) software development tools. In some embodiments, operation 202 is performed by a storage component the same as or similar to storage component 122 (shown in FIG. 1 and described herein).

At an operation 204, a presentation is effectuated and/or presented to a user, through a user interface, of a selectable user interface element. The selectable user interface element is associated with the particular artificial intelligence model. In some embodiments, operation 204 is performed by a presentation component the same as or similar to presentation component 120 (shown in FIG. 1 and described herein).

At an operation 206, responsive to the user selecting the selectable user interface element, a particular server is provisioned that includes a particular Graphics Processing Unit (GPU). In some embodiments, operation 206 is performed by a provision component the same as or similar to provision component 108 (shown in FIG. 1 and described herein).

At an operation 208, responsive to the user selecting the selectable user interface element, a container instance is launched on the particular server such that the user has access to the particular GPU through a software development environment within the container instance. In some embodiments, operation 208 is performed by a launch component the same as or similar to launch component 110 (shown in FIG. 1 and described herein).

At an operation 210, responsive to the user selecting the selectable user interface element, software is installed in the container instance, the software including one or more of (a) the software applications in accordance with the corresponding installation information, (b) the software libraries in accordance with the corresponding installation information, and/or (c) the software development tools in accordance with the corresponding installation information. In some embodiments, operation 210 is performed by an install component the same as or similar to install component 112 (shown in FIG. 1 and described herein).

At an operation 212, responsive to the user selecting the selectable user interface element, the particular AI model is installed in the container instance such that the user has access to the particular AI model. The access includes initiating execution of the particular AI model. In some embodiments, operation 212 is performed by an install component the same as or similar to install component 112 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. It is to be understood that the present technology contemplates that, to the extent possible, one or more features of any implementation can be combined with features of any other implementation.

What is claimed is:

1. A system configured to support on-demand deployment of pre-configured containers, the system comprising:
   electronic storage configured to store information electronically, wherein the stored information includes a particular artificial intelligence (AI) model and corresponding installation information, wherein the corresponding installation information includes references to one or more of:
   (a) software applications,
   (b) software libraries, and/or
   (c) software development tools; and
   one or more hardware processors configured by machine-readable instructions to:
   effectuate a presentation to a user, through a user interface, of a selectable user interface element, wherein the selectable user interface element is associated with the particular artificial intelligence model; and
   responsive to the user selecting the selectable user interface element:
   (i) provision a particular server that includes a particular Graphics Processing Unit (GPU);
   (ii) launch a container instance on the particular server such that the user has access to the particular GPU through a software development environment within the container instance;

(iii) install software in the container instance, the software including one or more of (a) the software applications in accordance with the corresponding installation information, (b) the software libraries in accordance with the corresponding installation information, and/or (c) the software development tools in accordance with the corresponding installation information; and (iv) download and install the particular AI model in the container instance such that the user has access to the particular AI model, wherein the access includes initiating execution of the particular AI model.

2. The system of claim 1, wherein the selectable user interface element is part of a browser extension and/or plug-in.

3. The system of claim 1, wherein the user has root access to the container instance running on a cloud services platform.

4. The system of claim 1, wherein the user interface is a browser interface, and wherein the user can use the particular AI model for inference directly from the browser interface.

5. The system of claim 1, wherein the container instance is managed by a container management software application similar to or based on DOCKER™, and wherein the container management software application performs launching the container instance and installing the software in the container instance.

6. The system of claim 1, wherein the container instance is managed by a container cluster manager similar to or based on KUBERNETES.

7. The system of claim 1, wherein the particular server uses an AMAZON™ Elastic Compute Cloud (EC2) instance provided through AMAZON WEB SERVICES™ (AWS).

8. The system of claim 1, wherein the container instance runs on either AWS, AZURE, or GCP.

9. The system of claim 1, wherein the one or more hardware processors are further configured to:

verify whether the user already has access to a given GPU through a given server;

verify whether the given GPU has sufficient capabilities for execution of the particular AI model;

wherein the container instance is launched on the given server, and wherein the particular AI model is installed such that the execution of the particular AI model is performed on the given GPU.

10. The system of claim 1, wherein the user interface presents multiple selectable user interface elements that are associated with multiple AI models, respectively.

11. The system of claim 1, wherein the software applications in accordance with the corresponding installation information include a particular version of PYTHON, and wherein the software libraries in accordance with the corresponding installation information include a particular version of CUDA.

12. The system of claim 1, wherein the particular AI model includes a neural network using over a billion parameters and/or weights.

13. The system of claim 1, wherein the particular AI model is a generative text-to-image AI model.

14. The system of claim 1, wherein the particular AI model is a large language model (LLM).

15. A method of supporting on-demand deployment of pre-configured containers, the method comprising:

storing information electronically, wherein the stored information includes a particular artificial intelligence (AI) model and corresponding installation information, wherein the corresponding installation information includes references to one or more of (a) software applications, (b) software libraries, and/or (c) software development tools;

effectuating a presentation to a user, through a user interface, of a selectable user interface element, wherein the selectable user interface element is associated with the particular artificial intelligence model;

provisioning, responsive to the user selecting the selectable user interface element, a particular server that includes a particular Graphics Processing Unit (GPU);

launching, responsive to the user selecting the selectable user interface element, a container instance on the particular server such that the user has access to the particular GPU through a software development environment within the container instance;

installing, responsive to the user selecting the selectable user interface element, software in the container instance, the software including one or more of (a) the software applications in accordance with the corresponding installation information, (b) the software libraries in accordance with the corresponding installation information, and/or (c) the software development tools in accordance with the corresponding installation information; and downloading and installing, responsive to the user selecting the selectable user interface element, the particular AI model in the container instance such that the user has access to the particular AI model, wherein the access includes initiating execution of the particular AI model.

16. The method of claim 15, wherein the selectable user interface element is part of a browser extension and/or plug-in.

17. The method of claim 15, wherein the user has root access to the container instance running on a cloud services platform.

18. The method of claim 15, wherein the user interface is a browser interface, and wherein the user can use the particular AI model for inference directly from the browser interface.

19. The method of claim 15, wherein the container instance runs on either AWS, AZURE, or GCP.

20. The method of claim 15, wherein the user interface presents multiple selectable user interface elements that are associated with multiple AI models, respectively.

* * * * *